Patented June 6, 1950

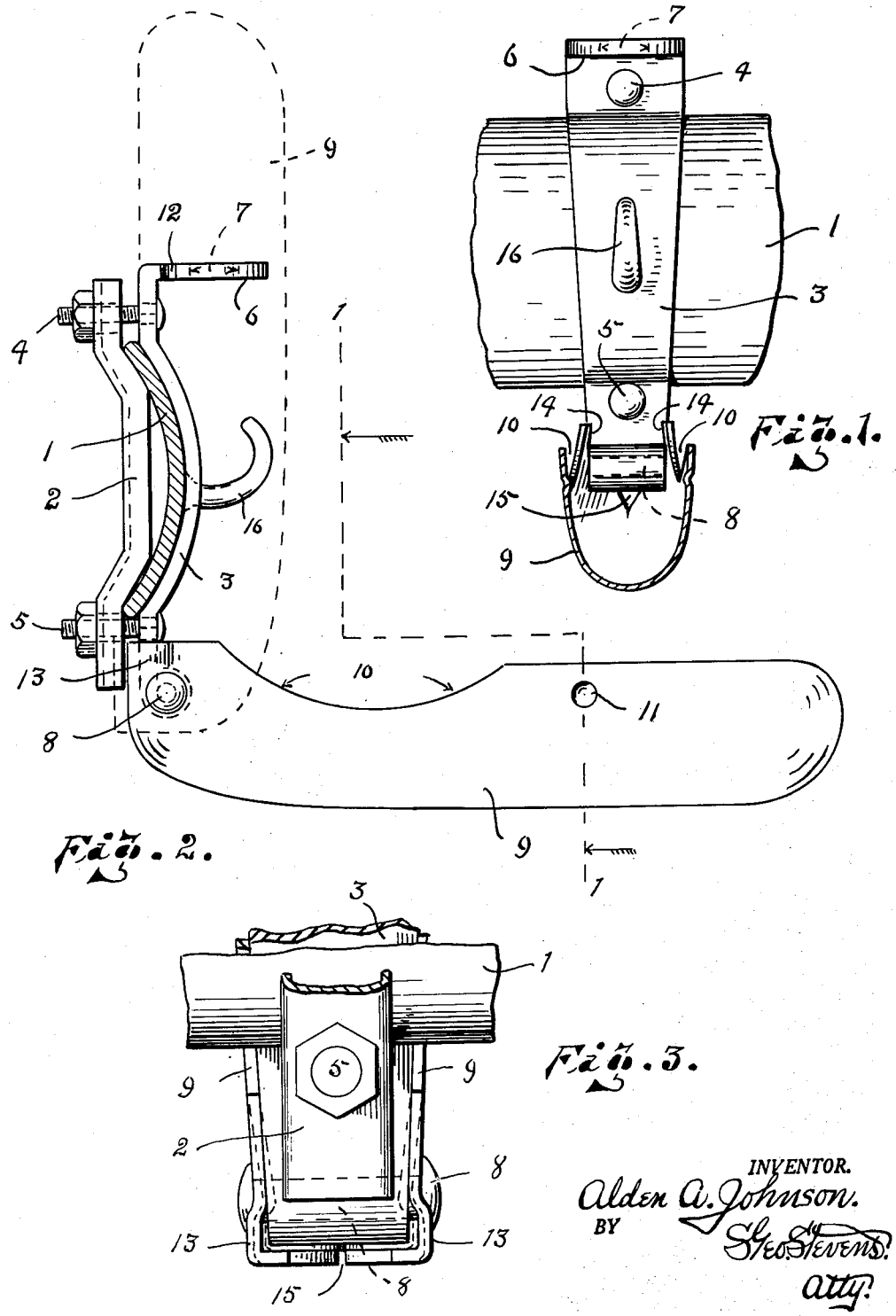

2,510,782

UNITED STATES PATENT OFFICE 2,510,782

COMBINED TRAILER HITCH AND GUARD

Alden A. Johnson, Minneapolis, Minn.

Application February 24, 1947, Serial No. 730,293

4 Claims. (Cl. 280—33.44)

This invention relates to a combined trailer hitch and guard.

The principal objects sought are to provide a more simple, practical and readily adjusted combination of elements than heretofore known.

Another object is to provide a combination hitch and guard that will appear as inconspicuous as possible when acting as a guard not only for the bumper and hitch but also for a trunk and possibly other objects carried upon the back of the car and forwardly of the bumper.

Other objects and advantages may appear as the description of the invention proceeds.

In the accompanying drawing forming part of this application:

Fig. 1 is a combined elevational view on the line 1—1, Fig. 2.

Fig. 2 is a side elevational view of the improved hitch as it appears ready to function as such with the guard dropped to horizontal position.

Fig. 3 is an enlarged front elevational view of the lower portion of the combined hitch and guard with the guard functioning as such.

The reference numeral 1 represents one type of common automobile bumper to which the improved guard is shown as applied.

This is accomplished by the space intermediate the members 2 and 3 being sufficiently opened to be mounted upon the bumper 1 and then clamped thereagainst by tightening up of the bolts 4 and 5 above and below the bumper.

The main body portion or hitch member of the combined hitch and guard is that indicated at 3 and the central portion thereof preformed arcuately to snugly fit transverse the outer surface of the bumper to which it is subsequently applied. The other more aptly referred to as the clamp 2 is shown as a pre-shaped piece of narrow channel iron provided with a bolt hole adjacent each end to register with similar holes adjacent the ends of the body member 3 for reception of the bolts 4 and 5 whereby to initially establish a firm and dependable attachment for the hitch and guard.

Just above the bolt 4 the upper end of the body portion 3 is bent outwardly as at 6 to form the principal hitching portion of the device and through which is formed the relatively large hole 7 for reception of any type of tow bar, chain, or other attachment desired.

The opposite or lower end of the body portion 3 is shaped to form a transverse eye for the reception of the bolt or pin 8 to provide a pivotal or hinge-like connection for the open elongated shell-like guard member 9 which is swingable upon its pivotal connection either to the horizontal position as shown wholly out of the way of the manipulation or operation of any hitching mechanism that may be used or vertically to the the position indicated in dotted lines Fig. 2.

When in this latter so-called closed or guarding position it must of necessity engage or at least neatly fit over the face of the bumper 1 and materially above same. For this purpose the opposed side walls of the guard 9 adjacent the pivotal end thereof are cut out arcuately as at 10 to so fit the outer face of the bumper 1.

A further feature of securely holding the guard member 9 in its uppermost non-rattling position is that upon either or both side walls thereof is formed an indentation 11, the protrusion of which interiorly will snap into suitable notches 12 formed in the opposite side edges of the head portion 6 of the body portion 3 of the hitch, said side walls being normally biased inwardly to insure such snap.

A still further normally silent hold fast provision for holding the guard snugly in its lowered position are the outwardly projecting opposed portions 13—13 of the side walls of the guard adjacent the pivotal supporting pin 8.

These outward projections are formed to a convenient width so that the inner socket-like portions thereof will snugly fit around the edges of the lower portion of the body member 3 when the guard is in its lowermost position. The walls of the guard 9, being biased inwardly at all times, snap inwardly as shown in dotted lines Fig. 3 and as shown at 14—14 in Fig. 1 when the guard is lowered to its extreme position. The lower end of the guard 9 is bifurcated as at 15 to permit of such abnormal springing.

From the above it is apparent that these outwardly projecting portions 13 will snugly engage and assist in clamping the guard against the lower portion of the body member 3 to complete its satisfactory silent coaction with the bumper of the car.

A further convenience of this novel unit is that of provision being made for attachment of an auxiliary towing or safety connection to a towed vehicle whereby to avoid more serious consequences when something may happen to prevent normal functioning of the major towing connection, such connection being shown as the hook-like member 16 fixed centrally of the body member 3 to which a chain or other auxiliary towing connection may be made.

Having thus described my invention, what I claim is:

1. A combined bumper guard and trailer hitch comprising a hitch member, a clamping member adapted for use in securing said hitch member to a bumper with said members held against opposed faces thereof, and a guard member carried by said hitch member, said hitch member being of a single piece of metal having the upper end thereof bent outwardly to form hitching means and the lower end thereof bent to form a transverse eye, said guard member being of U-shape in cross section and pivotally carried by said hitch member by means of a pin through said eye with the lower end of said guard member having its open face toward said hitch member whereby said hitch member is covered by said guard when in vertical position and exposed when said guard is swung downwardly on its pivotal connection to said hitch member.

2. A combined trailer hitch and bumper guard comprising a hitch member having a transverse eye at the lower end thereof and a hitch portion bent rearwardly from the upper end thereof, a clamp member, said hitch member being adapted to be secured to the outer face of a bumper by said clamp member with said clamp member on the opposite face of said bumper, and a guard pivotally carried at its lower end by a pin through said eye, said guard being of substantially U-shape in cross section whereby said hitch portion is enclosed by said guard when in vertical position, means to hold said guard in vertical position, and the lower end of said guard being of slightly spring material and having outwardly projecting portions which engage the adjacent side edges of said hitch member to hold said guard in horizontal position.

3. A trailer hitch and bumper guard comprising a hitch member having a transverse eye formed at its lower end and a hitch portion bent rearwardly from the upper end thereof, a clamp member, said hitch member being adapted to be secured to the bumper by said clamp member with said members holding each other on opposite faces of the bumper, a guard hingedly carried at its lower end by a pin through said eye, the lower end of said guard having outwardly extending portions and being of bifurcated spring material so that said extending portions may move inwardly to overlap the adjacent edge of said hitch member when said guard is hinged to lowermost position.

4. Means to hold a bumper guard at substantially right angles to the clamped member to which it is pivotally attached comprising, a bifurcated end adjacent the pivoted end of said guard, outward extensions projecting from the lower longitudinal edges of said guard, the width of said extensions being substantially the same as the thickness of the adjacent edges of said clamped member, and said guard being of spring material whereby when same is hinged to substantially right angular relation to said clamped member said extensions move inwardly and overlap the adjacent edges of said clamped member.

ALDEN A. JOHNSON.

REFERENCES CITED

The following references are of record in the file of this patent:

UNITED STATES PATENTS

| Number | Name | Date |
| --- | --- | --- |
| 2,148,242 | Monckmeier | Feb. 21, 1939 |
| 2,326,466 | Kitterman | Aug. 10, 1943 |
| 2,342,907 | Stall | Feb. 29, 1944 |